United States Patent [19]

Cuisinot

[11] Patent Number: 5,291,763

[45] Date of Patent: Mar. 8, 1994

[54] UNIVERSAL LOCK FOR QUICK RELEASE MECHANISM

[76] Inventor: Charles P. Cuisinot, 2120 Mills Ave., Menlo Park, Calif. 94025

[21] Appl. No.: 1,902

[22] Filed: Jan. 7, 1993

Related U.S. Application Data

[63] Continuation of Ser. No. 761,389, Sep. 18, 1991, abandoned.

[51] Int. Cl.$^5$ .............................................. E05B 71/00
[52] U.S. Cl. ........................................ 70/201; 70/233; 301/110.5
[58] Field of Search .................. 70/233, 225, 201, 258, 70/210, 211, 181; 280/279, 288.4; 301/110.5

[56] References Cited

U.S. PATENT DOCUMENTS

| | | | |
|---|---|---|---|
| 4,028,915 | 6/1977 | Stahl | 70/233 |
| 4,114,409 | 9/1978 | Scire | 70/225 |
| 4,191,036 | 3/1980 | Steinbach | 70/491 |
| 4,621,873 | 11/1986 | Weinstein et al. | 70/233 X |
| 4,724,692 | 2/1988 | Turin et al. | 70/233 X |
| 4,951,487 | 8/1990 | Dennis | 70/233 |
| 5,005,390 | 4/1991 | Giannini et al. | 70/233 X |
| 5,007,260 | 4/1991 | Sharp | 70/233 |
| 5,022,672 | 6/1991 | Kawai | 70/233 X |
| 5,118,125 | 6/1992 | Plunkett | 301/110.5 X |

Primary Examiner—Lloyd A. Gall
Attorney, Agent, or Firm—Janet Kaiser Castaneda

[57] ABSTRACT

A universal lock is provided for attachment to a conventional quick release mechanism of a bicycle, a bicycle carrier, or a bicycle seat post. The lock includes a conventional key operated plug lock mounted within a lock adaptor which in turn is rotatably mounted upon a lever housing. The lever housing includes an aperture for attachment of the conventional lever bore at the end of the shaft of the quick release mechanism. A camming mechanism with stop points is used to control rotation of the lock adaptor on the lever housing. In the locked position, the lever housing blocks movement of the lever arm. In the unlocked position, the lever housing may be rotated to enable operation of the lever.

19 Claims, 8 Drawing Sheets

UNIVERSAL LOCK FOR QUICK RELEASE MECHANISM

This application is a continuation of application Ser. No. 07/761,389, filed Sep. 18, 1991, now abandoned.

FIELD OF THE INVENTION

The present invention relates to locks for quick release mechanisms. More particularly, the invention relates to a universal lock that attaches to the lever bore assembly of conventional quick release mechanisms for bicycles, bicycle carriers and bicycle seat posts.

BACKGROUND OF THE INVENTION

Quick release mechanisms and locks for quick release mechanisms are known in the prior art. Bicycles typically include a quick release mechanism to enable the rider to quickly remove a wheel without tools. Riders may desire to remove a wheel to transport the bicycle, store the bicycle, or prevent theft of the bicycle.

Conventional quick release mechanisms include a manually operated lever which operates a cam shaft to secure or release the fork of the bicycle frame from the wheel. The ease of release requires a method for securing the wheel to the bicycle for security reasons. Additionally, it may be desirable to secure the wheel to the bicycle when riding to prevent accidental release of the wheel.

Several prior art locking devices exist in the prior art for quick release mechanisms. One such combination locking device and quick release mechanism is described in U.S. Pat. No. 4,028,915. The device includes a lockable housing and cover which prevents operation of the lever. The housing and cover must be removed from the device to operate the lever.

Another prior art lock assembly for a bicycle quick release assembly is described in U.S. Pat. No. 4,114,409 to Scire. The Scire device employs a shaft extension member that attaches to the end of the quick release lever. A housing containing a conventional lock and a device that clamps to the fork of the bicycle frame attaches to the opposite end of the extension member.

One other prior art quick release mechanism and integral lock is described in U.S. Pat. No. 4,621,873 to Weinstein et al. The device includes a conventional lock and a spring operated pin. In the locked position, the pin is engaged within a hole formed in the lever arm to prevent operation of the lever.

A heretofore unsolved need exists in the art for a universal lock that may be used with any conventional quick release mechanism, that does not require removal to operate the quick release mechanism, and that is small and light weight to enable the rider to leave the lock on the quick release while riding the bicycle.

SUMMARY OF THE INVENTION WITH OBJECTS

A general object of the present invention is to provide a universal lock for a quick release mechanism that overcomes the limitations and drawbacks of the prior art.

A specific object of the present invention is to provide a universal lock adapted for use with any conventional quick release mechanism for a bicycle, and for a conventional quick release mechanism of a bicycle carrier and a bicycle seat post.

Another specific object of the present invention is to provide a small, simple, inexpensive and light weight universal lock for a quick release mechanism.

Yet another specific object of the present invention is to provide a universal lock that attaches to the lever bore assembly of a conventional quick release mechanism, remains on the quick release mechanism whether in the locked or unlocked position, and is left on the quick release mechanism during operation of the bicycle.

In accordance with the present invention a universal lock is provided for attachment to a lever bore assembly of a conventional quick release mechanism. The lock includes a conventional key operated plug lock mounted within a lock adaptor which in turn is rotatably mounted upon a lever housing. The lever housing includes an aperture for attachment of the conventional lever bore at one end of the shaft of the quick release mechanism. A camming mechanism with stop points is used to control rotation of the lock adaptor on the lever housing. In the locked position, the lever housing blocks movement of the lever arm. In the unlocked position, the lever housing may be rotated to enable operation of the lever. Insertion of the key into the plug lock causes the pins 34 to be withdrawn from the pin recesses 35 of the lock housing 38 into the pin channels 32 of the lock body 28. When the pins 34 withdraw into the pin channels 32, the lock holder 38 is free to rotate on the lock body 28. The lock adaptor 40 is screw mounted to the holder 38 and rotates therewith. Removal of the key causes the spring loaded pins 34 to again enter the pin channels 35 of the lock holder 38 thereby preventing rotation of the lock holder and the lock adaptor 40.

The universal lock may be used with any bicycle, including mountain bikes, and may be attached to the quick release of a bike carrier to secure the forks of the bicycle frame to the carrier.

These and other objects, aspects, advantages and features of the present invention will be more fully understood and appreciated upon consideration of the following detailed description of preferred embodiments, presented in conjunction with the accompanying drawings.

DESCRIPTION OF A PREFERRED EMBODIMENT

Figure 1:
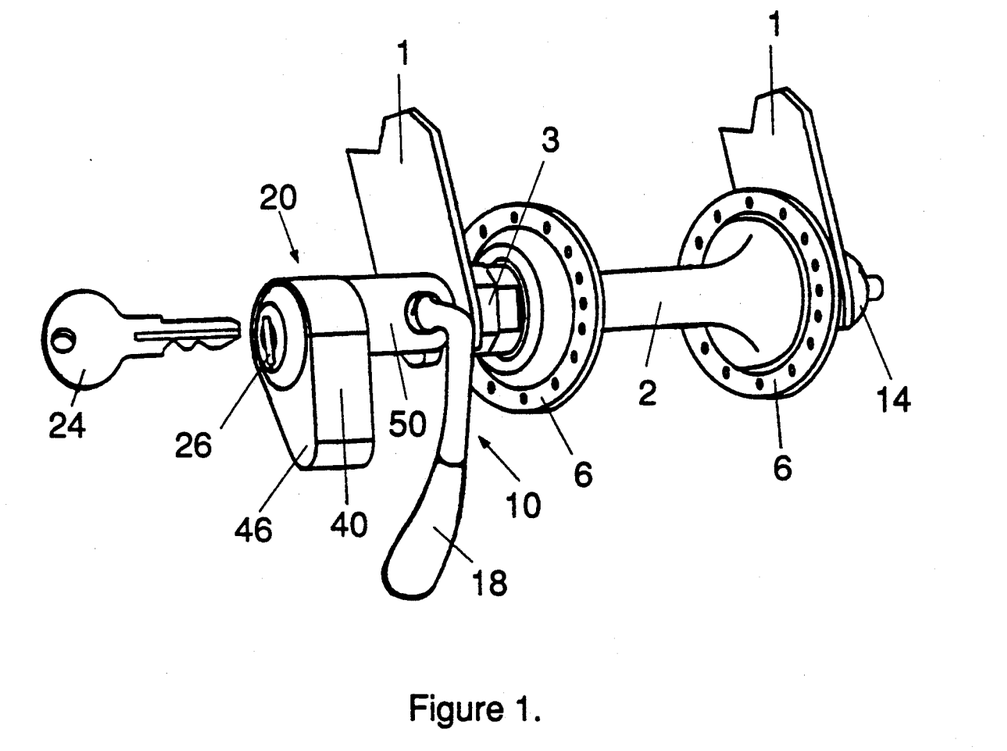
FIG. 1 is a perspective environmental view of the universal lock o present invention shown attached to a conventional mechanism of a bicycle.

A universal lock illustrating the principles of the present invention is shown generally at 20 in FIG. 1. The lock 20 is attached to a conventional quick release mechanism shown generally at 10. The two front forks of the bicycle frame are shown at 1.

Figure 6:
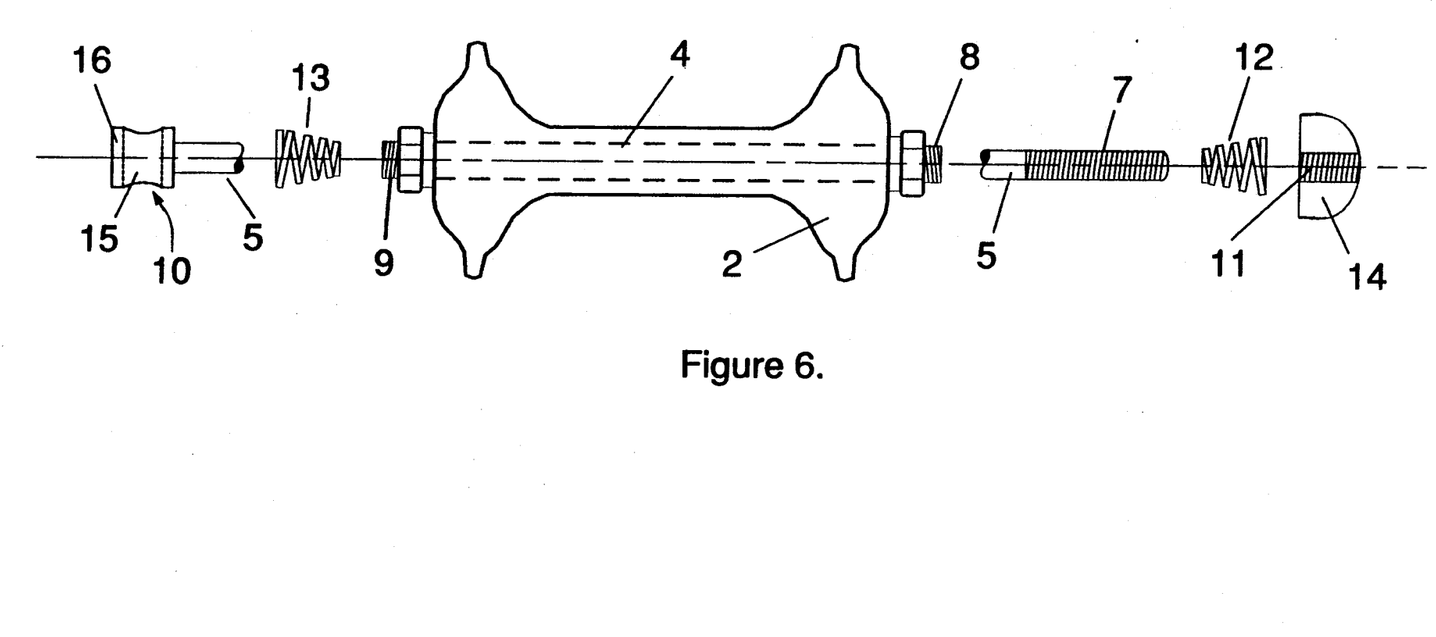
FIG. 6 is an exploded view of a conventional quick release lever bore assembly and shaft shown with a conventional hub and axle.
Figure 7:
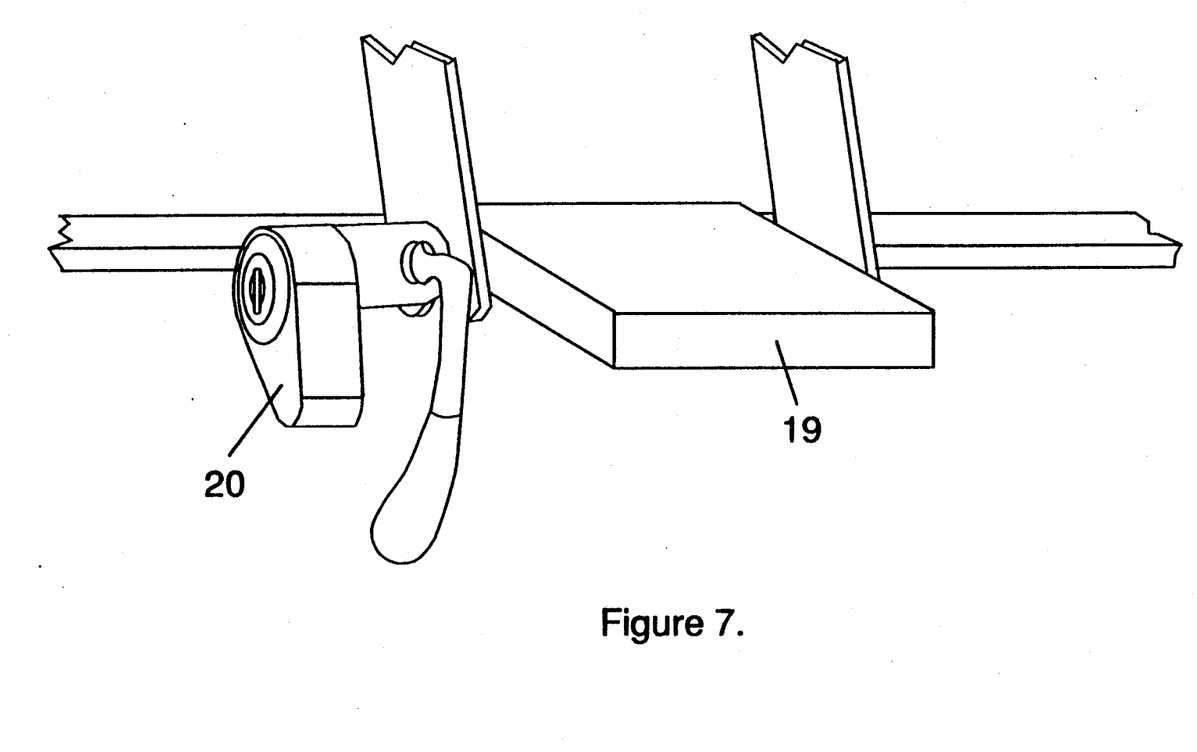
FIG. 7 is a perspective view in elevation of a lock assembly embodying the principles of the present invention shown attached to the lever bore assembly of a quick release for a bicycle carrier.
Figure 8:
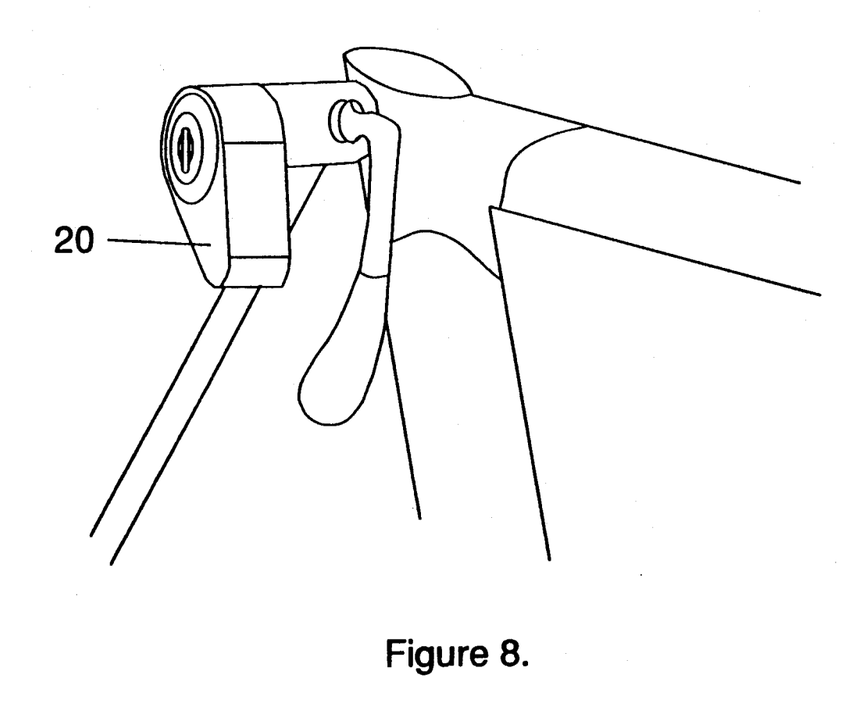
FIG. 8 is a perspective view in elevation of a lock assembly embodying the principles of the present invention shown attached to the lever bore assembly of a quick release for a bicycle seat.

Referring now to FIGS. 1 and 6, the conventional quick release mechanism attaches to a hub 2 mounted on a transversely extending bicycle axle 4. The bicycle wheels 6 are mounted to the forks 1 in a conventional manner. Both ends 8,9 of the axle 4 are threaded for attachment of conventional lock nuts 3 and washers. As is well known in the art, the forks 1 of the bicycle are mounted on the threaded ends 8,9 of the axle 4.

The quick release mechanism 10 includes a lever bore assembly 16 from which extends an actuating shaft 5 extending transversely through the hollow axle 4. The extending end of the shaft 5 is externally threaded and extends into an internally threaded end cap housing 14. A spring 12 mounts over the end 8 and the threaded end cap housing 14 is attached thereto.

Figure 4:
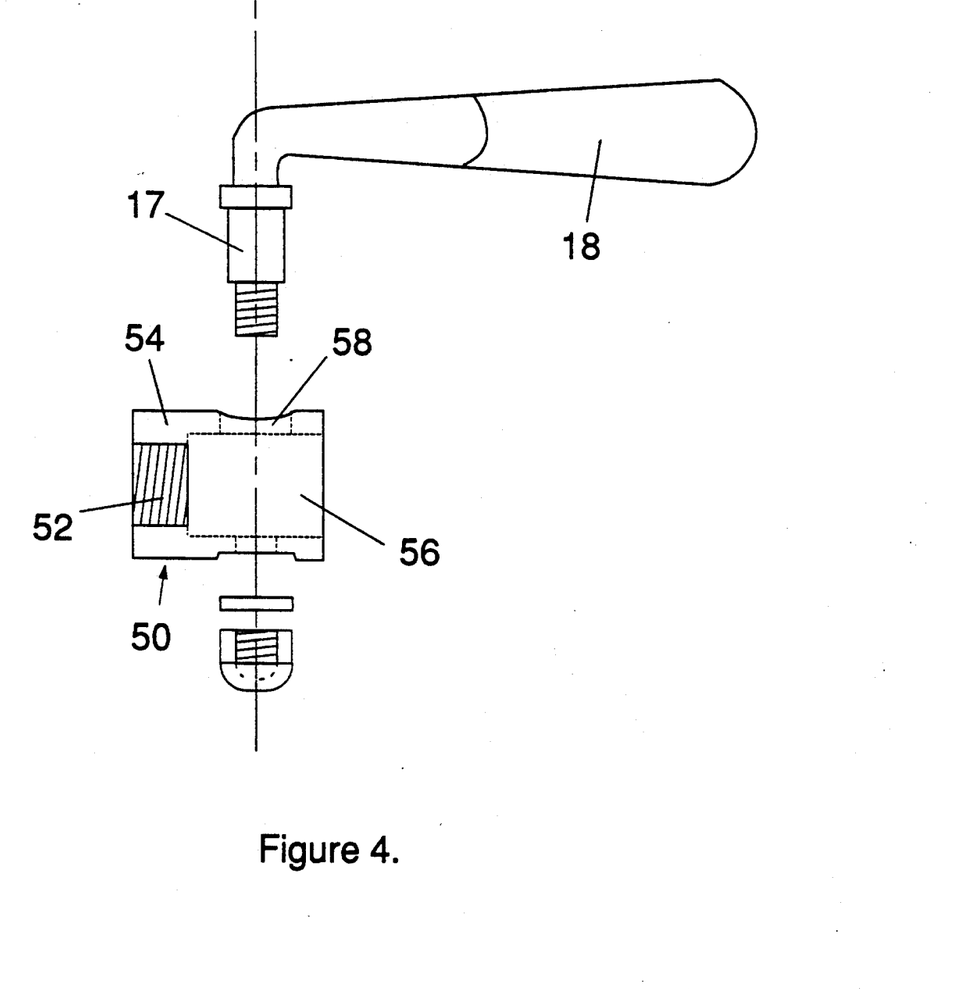
FIG. 4 is an exploded side view in partial section of the lever housing and showing the lever.

The lever bore assembly 16 of the quick release defines a bore 15 for the actuating end of the shaft 5 and for mounting the lever 18, see FIG. 4. The lever 18 includes a cammed shaft portion 17 which extends through the bore 15. Rotation of the lever 18 causes the associated actuating end of the shaft 5 to move longitudinally in a conventional manner with respect the bicycle frame thereby tightening or loosening the end nut 14, which in turn tightens or loosens the forks 1 relative to the frame. A spring 14 is mounted over end 9 with the second bicycle fork 1 to complete attachment of the quick release mechanism 10 to the end 9, as best seen in FIG. 1.

Figure 2:
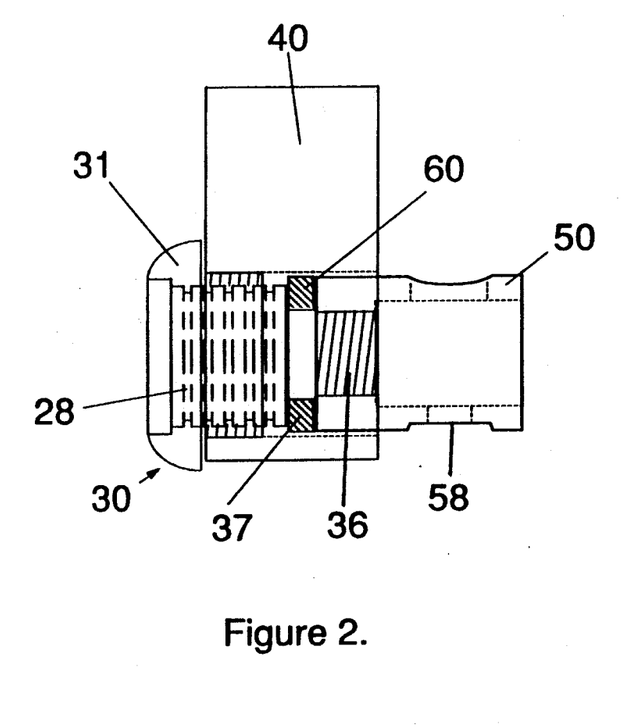
FIG. 2 is a side sectional view of the assembled lock mechanism, lock adaptor, and lever housing of FIG. 1 shown without the conventional lever bore assembly of the quick release mechanism.
Figure 3:
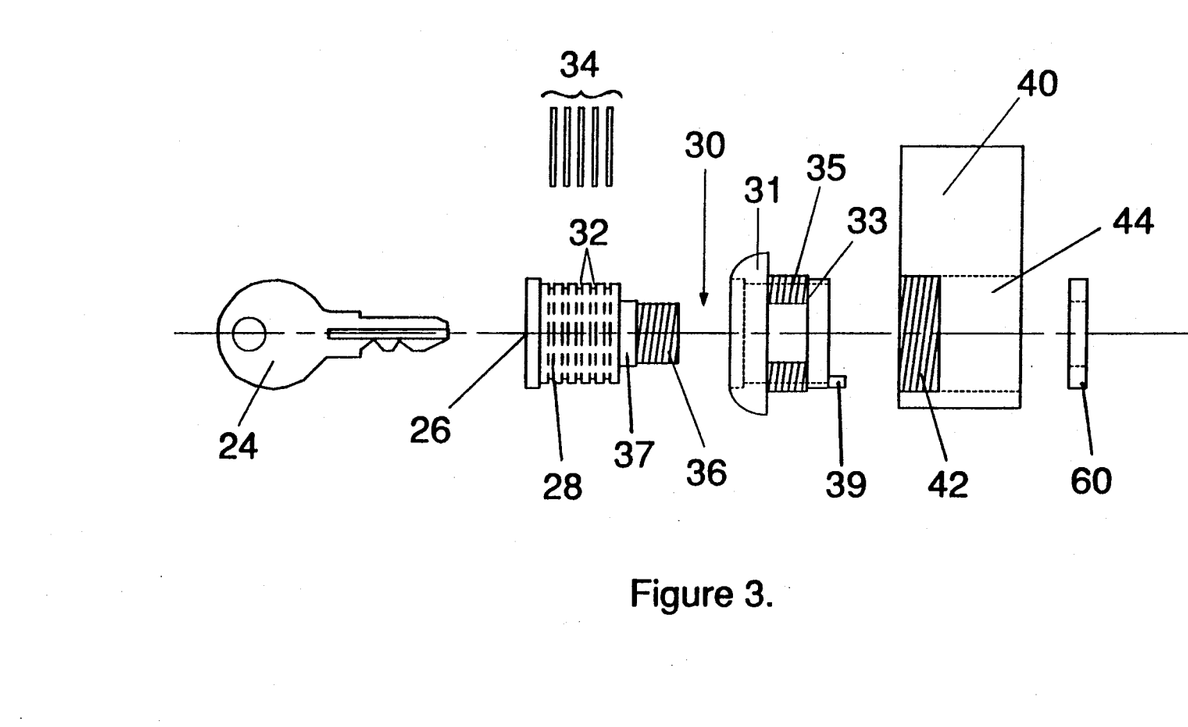
FIG. 3 is an exploded side view in partial section of the lock mechanism and lock adaptor.

Referring now to FIGS. 1, 2 and 3, the lock 20 of the present invention is shown.

The lock 20 is preferably made from stainless steel and includes three major components: a conventional plug lock 30, a lock adaptor 40, and a lever housing 50. When assembled as shown in FIG. 2, the plug lock 30 and the lever housing 50 are both attached within the lock adaptor 40, and the lock 30 is attached to the lever housing 50. The preferred plug lock 30 is configured so that the key 24 cannot be removed from the lock 30 until the rotatable lock adaptor 40 is correctly positioned.

Figure 5:
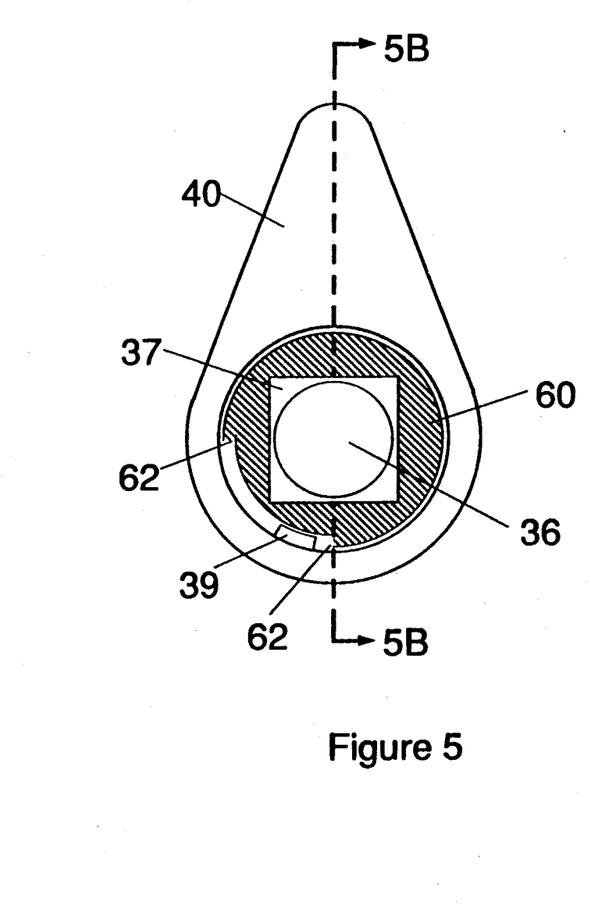
FIG. 5 is a an end view of the camming mechanism showing the camming device mounted on the plug lock with the lock splined into the lock holder which is in turn screwed into the lock adaptor.
Figure 5B:
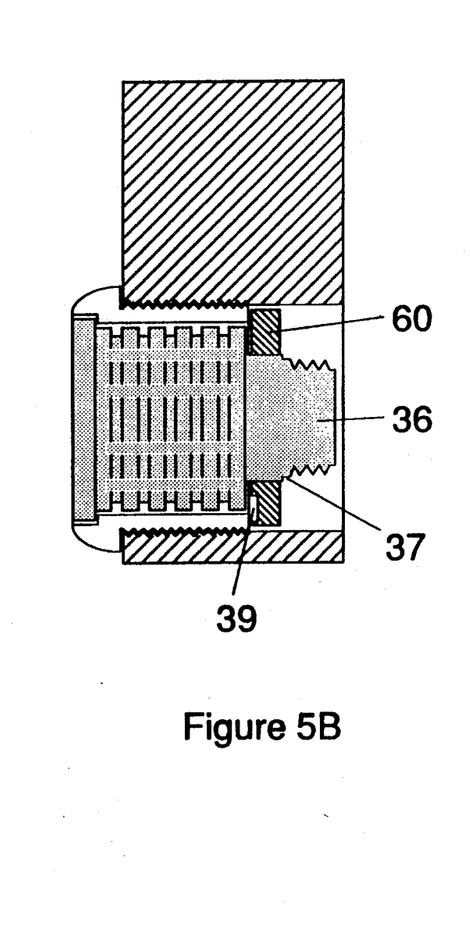
FIG. 5B is a cross section of FIG. 5 taken along lines 5B—5B.

As best seen in FIGS. 2, 3, and 5B, the conventional plug lock 30 includes a key 24 for insertion into a slot 26 of a cylindrical lock body 28. The lock body 28 defines pin channels 32 for receipt of spring loaded pins 34, a rectangular flange portion 37 (best shown in FIG. 5), and an externally threaded, cylindrical shaft 36. The lock 30 is assembled by inserting the lock body 28 into a corresponding spline or slot formed in a conventional cylindrical lock holder 38. The lock holder 38 defines corresponding pin recesses 35 for the pins 34, an annular head portion 31, and a cylindrical shaft portion 33. The purpose of a cam body 39 extending outwardly from the cylindrical shaft portion 33 will be described below. The cylindrical shaft portion 33 of the holder 38 is externally threaded for attachment to internal threads 42 in the lock adaptor 40.

The lock adaptor 40 includes cylindrical bore 44 therethrough and defines generally triangular shaped extension member 46. When the lock adaptor 40 is rotated into the locked position, the extension member 46 obstructs the full range of movement of the lever 18 thereby preventing sufficient movement of the lever 18 to release the wheel from the bicycle.

Referring now to FIGS. 5 and 5B, a camming device 60 is mounted in the bore 44 of the lock adaptor 40 and on the rectangular flange 37 of the lock body 28 after the assembled lock 30 is screwed onto the internal threads 42 of the lock adaptor 40. The generally circular camming device 60 resembles a washer defining a pair of stops 62. The cam body 39 extends from the lock housing 38 and is positioned between the stops 62. The cam body 39 moves between the stops 62 thereby limiting the rotation of the attached lock adaptor 40 mounted on the lever housing 50. It will be recognized by those skilled in the art that the rotational limits may vary and that any pivot limiting device may be used. Following installation of the camming device 60, the lever housing 50 may be threaded onto the shaft 36 of the lock 30.

Referring now to FIG. 4, the lever housing 50 is a generally cylindrical body defining an internally threaded bore 52 within a first end 54. The bore 44 of the lock adaptor 40 attaches over end 54, and threaded end 36 of the lock body 28 screws into the threaded bore 52, as best seen in FIG. 2. The end 54 of the installed lever housing 50 butts up flush against the camming device 60. The housing 50 also defines an axial bore 56 and a vertical bore 58 extending therethrough for attachment of the lever 18. The axial bore 56 receives the conventional lever bore assembly 16 which includes a mating bore 15, see FIG. 6, for the lever 18.

Following installation of the assembled lock 30 in the adapter 40, mounting the adapter 40 on the end 54, and installation of the lever bore assembly 16 of the conventional quick release 10, the universal lock 20 need not be removed if desired. To lock the universal lock 20, the key 24 is inserted into the slot 26. The key 24 teeth cause retraction of the pins 34 in a conventional fashion which permits the lock adaptor 40 to rotate on the lever housing 50, limited by the stops 62 and the cam body 39. The lock adaptor 40 is rotated until the extension member 46 is positioned to obstruct free movement of the lever 18. In the preferred embodiment, the key 24 may not be removed until the lock adaptor 40 is in the locked, blocking position. The key 24 is then removed from the slot 26 thereby releasing the retracted spring loaded pins 34 so that the adaptor 40 is locked in position. The locked position is suitable for riding to prevent inadvertent release of the wheel 6 from the bicycle, for security purposes to prevent theft of the wheel, to prevent removal from a bicycle carrier, and to prevent removal of a bicycle seat from the seat post.

To remove the bicycle wheel, the key 24 is inserted to retract the pins 34. The adaptor 40 is rotated out of the path of motion of the lever 18, and the lever 18 is moved to operate the quick release 10 thereby releasing the wheel 6.

To those skilled in the art to which the present invention pertains, many widely varying embodiments and implementations of the principles of the present invention will be suggested from the foregoing. For instance, the shape of the adaptor may be modified and other suitable metals, coated or painted, may be used for the universal lock. The description and disclosures presented herein are by way of illustration only and should not be considered to limit the present invention, the scope of which is more particularly set forth in the following claims.

What is claimed is:

1. A lock for attachment to a conventional quick release mechanism, the lock comprising:
   a plug lock mechanism having spring mounted pins which retract upon insertion of a key, the pins moving to an extended position when the key is removed;
   a rotatable lock adaptor means having a threaded bore for attachment of the plug lock mechanism, the lock adaptor means prevented from rotating when the pins are in the extended position, the lock adaptor means defining extension means for preventing operation of the quick release mechanism when the pins are in the extended position and the lock adaptor means is rotated to a first blocking position; and
   a housing for rotatably mounting the lock adaptor means thereon, the housing having an axial bore therethrough with means for attachment therein of the quick release mechanism and means for attachment therein of the plug lock mechanism.

2. A lock mechanism for a quick release device with a shaft attached to a lever bore assembly and a manually operated lever for actuating the shaft to operate the quick release, the lock mechanism comprising:
   a housing means having a first and a second end, the first end defining means for mounting the lever bore assembly and means for mounting the lever;
   an adaptor having a first and a second end and defining a bore therethrough, the first end of the adaptor rotatably mounted on the second end of the housing, the adaptor further defining a barrier means, rotation of the adaptor to a first position causing the barrier means to obstruct operation of the quick release lever;
   a key actuated lock means attached within the second end of the adaptor and attached to the second end of the housing means, removal of a key from the lock means preventing rotation of the adaptor from the first position, insertion of said key into the lock means enabling rotation of the adaptor to a second position allowing operation of the quick release lever.

3. The lock mechanism of claim 2 wherein the quick release device is attached to a hub and axle assembly for a bicycle wheel.

4. The lock mechanism of claim 2 wherein the quick release device is attached to a rack for carrying a bicycle on vehicle.

5. The lock mechanism of claim 2 wherein the quick release device is attached to a bicycle seat assembly.

6. The lock mechanism of claim 2 wherein the key actuated lock means is a conventional plug lock assembly comprising:
   the key,
   a lock body having a key slot and defining a plurality of spring loaded pins mounted within a plurality of pin channels, the lock body further defining a threaded shank portion screw mounted within the second end of the housing means; and
   a lock enclosure for mounting the lock body therein, the lock enclosure defining a threaded shank portion having an opening therethrough for the spring loaded pins, the lock enclosure screw mounted to the second end of the adaptor.

7. The lock mechanism of claim 6 further comprising a stop pivot means attached to the shank of the lock body for limiting the rotation of the lock adaptor.

8. The lock mechanism of claim 2 wherein the barrier means is generally triangular in shape.

9. The lock mechanism of claim 2 wherein the means for mounting the lever is a vertical bore extending through the housing and aligned with and substantially perpendicular to the attached lever bore assembly, the manually operated lever extending through the vertical bore and the lever bore assembly for actuation of the shaft.

10. A lock for attachment to a lever bore assembly of a quick release mechanism, the lock comprising:
    a lock means having first and second coupling means;
    a housing means defining a first and second end, an axial bore therethrough, and a second bore at the first end substantially perpendicular to the axial bore and extending therethrough, the lever bore assembly attached within the first end and a shaft of an actuating lever of the quick release mechanism attached within the second bore and to the lever bore assembly; and
    a lock adaptor means defining a barrier means and an axial bore therethrough having first and second ends thereof, the first end rotatably mounted over the second end of the housing means, the second end of the axial bore defining means for attachment of the first coupling means of the lock means, the second coupling means of the lock means attached within the second end of the housing means when the lock means is attached to the lock adaptor means and the lock adaptor means is mounted on the housing means, rotation of the lock adaptor means to a first position causing the barrier means to obstruct operation of the actuating lever when the lock means is locked, unlocking the lock means enabling rotation of the lock adaptor means to enable operation of the actuating lever.

11. The lock of claim 10 wherein the means for attachment of the first coupling means of the lock means is internal threads in the second end of the axial bore of the lock adaptor means.

12. The lock of claim 11 wherein the barrier means is an integral extension member.

13. The lock of claim 12 further comprising a camming mechanism for limiting the rotation of the lock adaptor means on the housing means.

14. The lock of claim 12 wherein the second coupling means is external threads on the lock means for attachment to internal threads at the second end of the housing means within the axial bore thereof.

15. The lock of claim 12 wherein the second coupling means is a male member for attachment within a corresponding female receptacle defined in the axial bore at the second end of the housing means.

16. The lock of claim 13 wherein the lock means is a key actuated plug lock.

17. The lock of claim 16 wherein the key cannot be removed from the plug lock unless the lock adaptor means is positioned so that the extension member prevents movement of the lever.

18. The lock of claim 16 wherein the key actuated plug lock comprises:
the key,
a lock body having a key slot and defining a plurality of spring loaded pins mounted within a plurality of pin channels, the lock body further defining a flange and a shank portion for attachment within the second end of the housing means; and
a lock enclosure for mounting the lock body therein, the lock enclosure defining a portion having openings therethrough for the spring loaded pins, the lock enclosure further defining a cam body, the lock enclosure screw mounted to the second end of the lock adaptor means.

19. The lock of claim 18 further comprising a stop pivot means mounted on the flange of the lock body, the stop pivot means defining stops for the cam body for limiting the rotation of the lock enclosure and the lock adaptor means.

* * * * *